Dec. 24, 1929.　　　　G. W. WARMOTH　　　　1,740,555
KERFING SAW
Filed Feb. 7, 1927　　　2 Sheets-Sheet 1
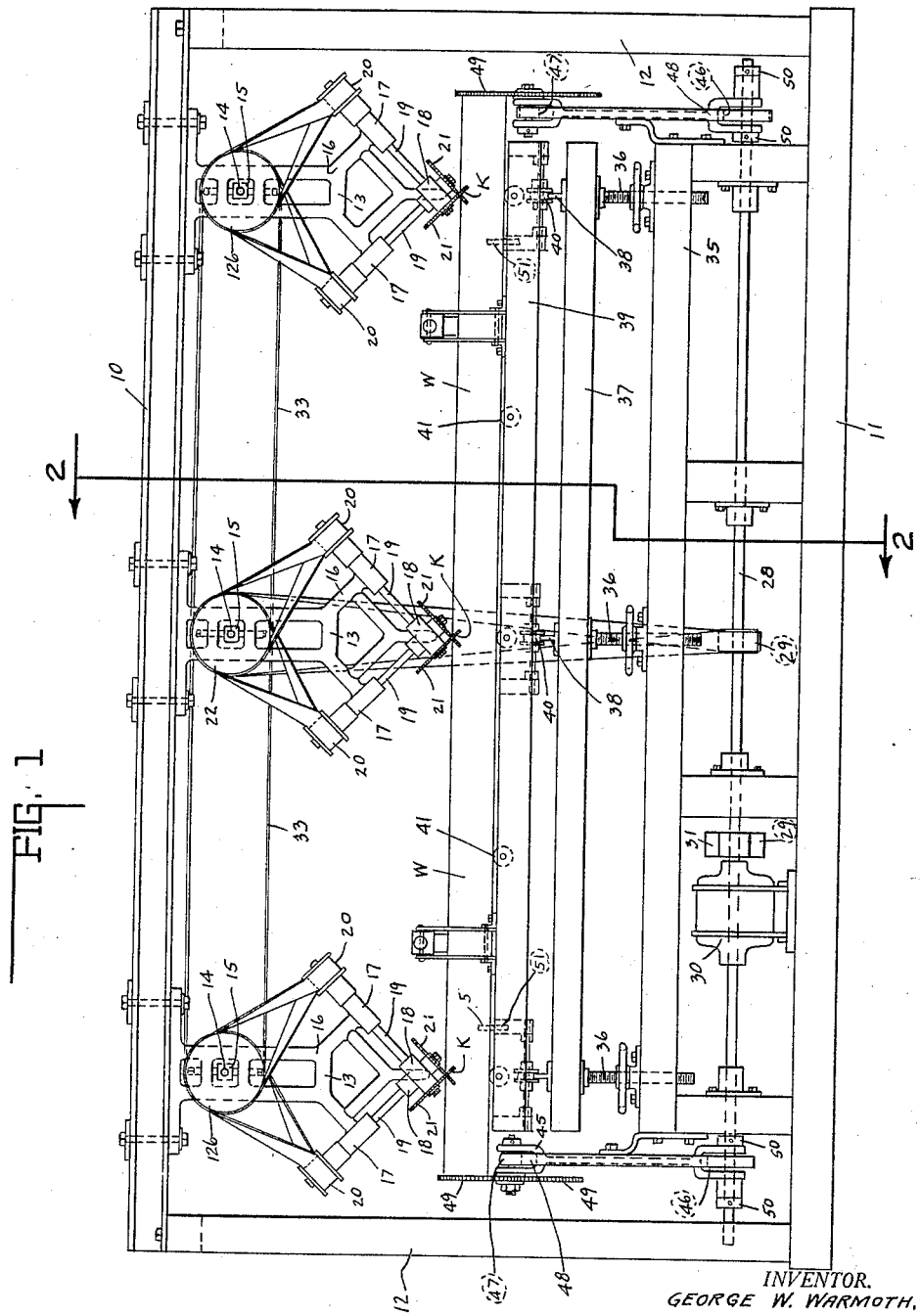
INVENTOR.
GEORGE W. WARMOTH,
BY
ATTORNEYS.

Dec. 24, 1929.   G. W. WARMOTH   1,740,555
KERFING SAW
Filed Feb. 7, 1927   2 Sheets-Sheet 2
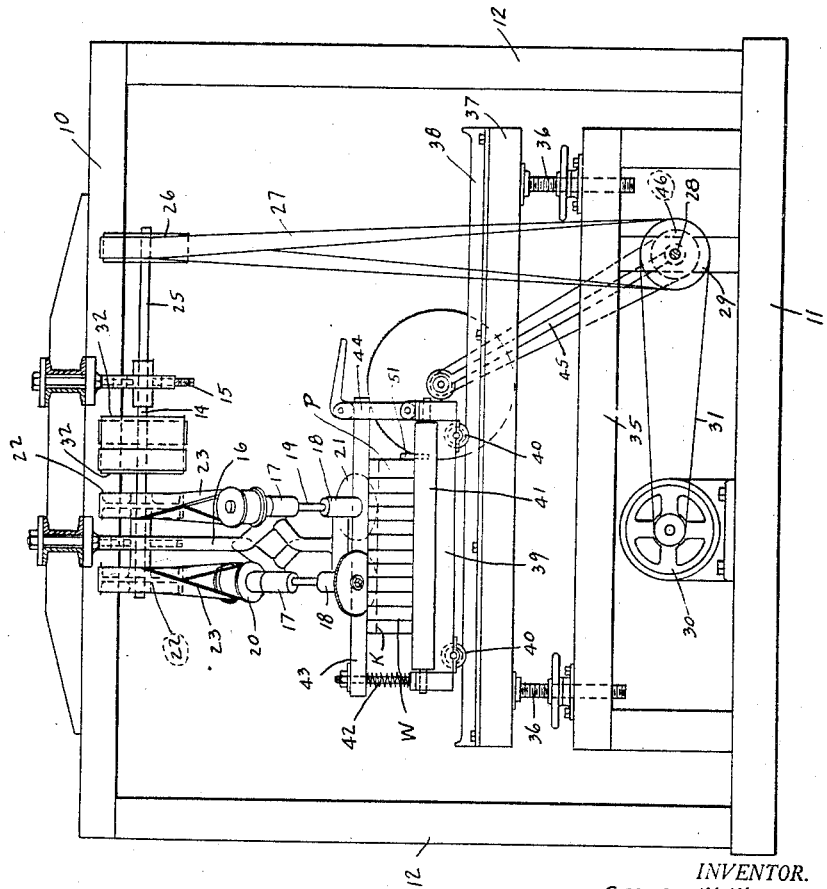
INVENTOR.
GEORGE W. WARMOTH Patented Dec. 24, 1929

1,740,555

UNITED STATES PATENT OFFICE

GEORGE W. WARMOTH, OF INDIANAPOLIS, INDIANA, ASSIGNOR TO COLUMBUS CREO-SOTING COMPANY, OF COLUMBUS, INDIANA, A CORPORATION

KERFING SAW

Application filed February 7, 1927. Serial No. 166,383.

This invention relates to a kerfing machine.

The chief object of this invention is to provide simple means for simultaneously producing a plurality of intersecting or angularly positioned kerfs in a plank or the like.

The chief feature of the invention consists in the positioning of a plurality of kerf producing elements in juxtaposition to each other for producing substantially simultaneously a plurality of angularly arranged and intersecting kerfs.

Other features of the invention whereby its application may be made universal will be pointed out hereinafter in detail.

The full nature of the invention will be understood from the accompanying drawings and the following description and claims.

In the drawings Fig. 1 is a front elevation of the kerfing machine and means supported and operated upon thereby. Fig. 2 is a transverse section taken on line 2—2 of Fig. 1 and in the direction of the arrows.

In the drawings 10 indicates an overhead framework supported in spaced relation to the base 11 by standards 12. Adjustably and detachably supported by the upper framework are a plurality of kerfing units and since they are alike, a description of one only will be given.

The base or hanger bracket 13 is mounted as aforesaid adjustably supports the unit power shaft 14 in the adjustable bearings 15. One of said brackets is extended at 16 and terminates in a plurality of aligned bearings, herein the bearings being aligned by pairs, 17 indicating the upper bearings and 18 the lower bearings. Herein aligned pairs of bearings are positioned in parallel planes (see Fig. 2) and the axes are positioned angularly of each other (see Fig. 1). Each pair of bearings supports a shaft 19 which terminates beyond the same, the upper end supporting power pulley 20 and the lower end the circular kerfing saw 21. A pair of pulleys 22 are mounted on shaft 14 and each drives a shaft 19 through belt 23. Thus, the saws 21 are operated in unison and as shown, substantially simultaneously form the kerfs K in the work W. In Fig. 2 the work W is shown as comprised of a plurality of planks P.

As shown in Fig. 1, the kerfing units are employed, one positioned near each end of the work and the other or others intermediate thereof. The central shaft 14 is extended at 25 and carries a power pulley 26 driven by belt 27 from the power take off shaft 28 carrying pulleys 29, one of which is driven by the motor 30 through belt 31. Shaft 14 carrying the pulley 26 also carries pulleys 32, each of which by a belt 33 drives a similar pulley 126 on the end shaft 14. Thus, all the units are driven in unison.

A sub-base 35 through the manually rotatable screw standards 36 positions framework 37 at the desired predetermined distance from saws 21. Frame 37 has trackways 38 extending transversely of the machine. An upper work supporting carriage 39 has rollers 40 movable on the trackways for feeding the work transversely for cutting off and kerfing. The carriage 39 includes transverse rollers 41 for supporting the work. By means of these rollers the work can be fed longitudinally of and to the saws between cuts. Suitable clamps 42, 43 and 44 secure the planks in rigid relation on the carriage 41. Suitable stops 51 align the work.

For cutting off purposes, the shaft 28 is extended and adjustably and slidably mounted on each end by collars 50 is an arm 45. The lower end straddles pulley 46 and the upper end supports pulley 47, said pulleys by belt 48 driving circular saw 49.

When the planks P are of tapered section the frame 37 may be tilted to take care of the tapering so that each kerf can be cut to the predetermined depth.

The invention claimed is:

1. A saw unit including a hanger, a drive shaft rotatably supported thereby, a pair of driving wheels thereon, a diamond shaped extension depending from said hanger by one corner, a shaft bearing at each of the adjacent corners, a pair of shaft bearings at the lower corner, a pair of each of said bearings being in alignment and lying in substantially parallel planes and substantially transverse to the shaft axis, a shaft at each pair of aligned bearings and projecting beyond the same, a driven wheel at the upper end of each of said last mentioned shafts, means connecting said wheels for simultaneous and opposite driving of said last mentioned shafts, and a disk type saw carried by the lower ends of each of said last mentioned shafts, the planes of said saws intersecting for the purpose described.

2. A machine for simultaneously forming in one or more parallel positioned articles of work, a plurality of transverse kerfs therein and in intersecting arrangement, comprising a plurality of rotatably mounted saws each forming a kerf, a pair thereof having their axis inclined to the work and the plane of movement thereof, a carriage for moving the work transverse to the elongated positioning thereof, a frame above the carriage for supporting said saws, and a unit support for each pair of saws arranged to support the same to form a pair of parallel and intersecting kerfs therein, and parallel to the movement of the work.

In witness whereof, I have hereunto affixed my signature.

GEORGE W. WARMOTH.